United States Patent [19]

Vallet

[11] 3,910,959

[45] Oct. 7, 1975

[54] 1-(3,4-METHYLENEDIOXY-PHENYL)-4,4-DIMETHYL-PENT-1-EN-3-OL

[75] Inventor: Francois Marie Joseph Vallet, Paris, France

[73] Assignee: Unicler, Paris, France

[22] Filed: Feb. 27, 1973

[21] Appl. No.: 336,242

[30] Foreign Application Priority Data
Feb. 28, 1972 France .......................... 72.06676

[52] U.S. Cl............................. 260/340.5; 424/282
[51] Int. Cl.²....................................... C07D 317/54
[58] Field of Search ................................ 260/340.5

[56] References Cited
OTHER PUBLICATIONS
Pace, Chem. Abstracts, Vol. 23, (1929), p. 4942.

Primary Examiner—James A. Patten
Attorney, Agent, or Firm—Armstrong, Nikaido & Wegner

[57] ABSTRACT

The compounds of the formula:

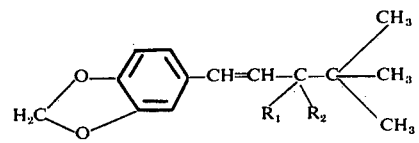

in which one of $R_1$ and $R_2$ is hydrogen and the other is hydroxyl, or $R_1$ and $R_2$ together represent oxygen, made by condensing piperonal with pinacoline and if desired reducing the ketone obtained to the corresponding alcohol, have interesting pharmacological properties, e.g., as potentiators of narcotics and analgesics.

1 Claim, No Drawings

1-(3,4-METHYLENEDIOXY-PHENYL)-4,4-DIMETHYL-PENT-1-EN-3-OL

The present invention provides the two new compounds which are the 1-(3,4-methylenedioxy-phenyl)-4,4-dimethyl-1-pentene derivatives of the formula:

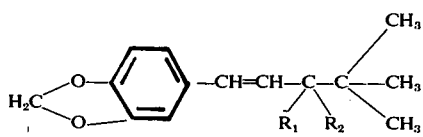

in which one of $R_1$ and $R_2$ is hydrogen and the other is hydroxyl or $R_1$ and $R_2$ together denote oxygen.

According to a feature of the invention, these compounds are prepared by condensation of pinacoline and piperonal in an alkaline aqueous medium. This gives the ketone, which may then, if desired, be reduced to the alcohol by a method known for converting ketones to alcohols. Preferably the reduction is effected with potassium borohydride.

The following Examples illustrate the invention.

EXAMPLE 1

A mixture of 20 g (0.2 mol) of pinacoline and 30 g (0.2 mol) of piperonal dissolved in 50 ml of ethyl alcohol is added continuously to a mixture of 600 ml of water and 40 g of NaOH, cooled to ambient temperature and stirred magnetically. Stirring of the mixture is continued at ordinary temperature for a minimum of 10 days (generally 15 days). After a few days, an oily layer forms which becomes more and more dense and then sets solid and splits up into solid lumps. Stirring is continued until the solid masses break up of their own accord to give a heavy, bright yellow, homogeneous precipitate.

This precipitate is filtered off and recrystallised from ethanol. The product, 1-(3,4-methylenedioxy-phenyl)-4,4-dimethyl-pent-1-en-3-one (hereinafter referred to as D 305), forms yellow needles and melts at 93°C. The yield is approximately 75%.

EXAMPLE 2

23.2 g (0.1 mol) of the ketone produced in Example 1 are dissolved in 200 ml of methanol, in an Erlenmeyer flask with a magnetic stirrer, and 5.4 g (0.1 mol) of potassium borohydride and then added slowly, in small portions. As the addition proceeds, the solution, which was bright yellow at the start, becomes paler and finally turns colourless at the end of the operation. A little acetone and water are finally added and the whole is heated to 50°C to decompose the excess borohydride. The solution is filtered if necessary and the product is precipitated by adding water.

1-(3,4-Methylenedioxy-phenyl)-4,4-dimethyl-pent-1-en-3-ol (hereinafter referred to as D 306) forms a compact, white precipitate. On recrystallising it from ethanol, fine, colourless needles are obtained which melt at 74°C. The yield is approximately 95%.

The two new compounds have been tested pharmacologically.

The acute toxicities, determined by the "Log-Probits" method, as the LD 50's in mg/kg are as follows:

| Compound | Animal | Method of administration | |
|---|---|---|---|
| | | oral | intraperitoneal |
| Ketone D 305 | Mice | >2,000 | |
| Alcohol D 306 | Mice | >3,000 | 1,250 |
| ditto | Rats | >3,000 | 1,050 |

The chronic toxicity of the alcohol D 306 was investigated in rats (30 males divided into batches of 10). The compound was administered at the rate of 750 or 250 mg/kg/day (10 animals per dose) suspended in water to which carboxy-methyl-cellulose had been added, with 10 control animals receiving only carboxymethyl-cellulose. The experiment lasted for 8 weeks and then half of the animals were observed for 2 weeks after stopping the treatment. The weight curves of the treated animals were normal and comparable to those of the control animals. Likewise, haematological examinations revealed only an increase in polynuclear neutrophils at both doses. After stopping for 2 weeks, the picture returned to normal.

Macroscopic and microscopic examinations did not reveal significant lesion in the organs examined.

The alcohol D 306 was subjected to a large number of experiments to determine its effect on the central nervous system. The techniques applied, the doses administered, the methods of administration, the animals used and the results obtained are given in Table I which follows; in this table, p denotes the probability factor in relation to the differences observed between the results relating to the treated animals and the results relating to the control animals.

TABLE I

| Experiment | CENTRAL NERVOUS SYSTEM | | | |
|---|---|---|---|---|
| | Dose, mg/kg | Administration | Animals | Results |
| INVESTIGATION OF BEHAVIOUR | | | | |
| Equilibrium and muscular tonus | | | | |
| Turning rod (Boissier, Actualities Pharmacologiques, 12th series, p. 1) | 100 and 200 | intraperitoneal | mice | none |
| traction (ibid) | 100 and 200 | intraperitoneal | mice | ditto |
| chimney (Boissier, Med. exp., 1960, 3, 81–84) | 100 and 200 | intraperitoneal | mice | ditto |
| Curiosity - Anxiety-exploratory activity | | | | |
| Plate with holes (Boissier, Arch. Int. Pharm., 1964, 147, 372–388) | 100 and 200 | intraperitoneal | mice | ditto |
| evasion (Boissier, Therapie, 1965, XX, 895–905) | 50, 100 and 200 | intraperitoneal | mice | ditto |
| "Open field" or | 50 and 100 | intraperitoneal | rats | ditto |

TABLE I – Continued

| Experiment | CENTRAL NERVOUS SYSTEM Dose, mg/kg | Administration | Animals | Results |
|---|---|---|---|---|
| situation inducing anxiety (Fontenay, J. Pharmacol. Paris, 1970, 1,243–254) | 200 | intraperitoneal | rats | decrease in activity – 55% relative to the controls 0.01 <P<0.001 |
| Aggressiveness battle caused by electric shock (Brunaud, International Neuropharmacological Conference, Rome, 1958) | 50, 100 and 200 10 | intraperitoneal oral | rats rats | none 22% increase in aggressiveness |
| Catalepsy 3 bungs technique (Courvoisier, Psychotropic drugs, Elsevier Pub. Company, 1957, 373) | 100, 200 and 250 | intraperitoneal | rats | none |
| Locomotor activity (Psychopharmacologie, Berl., 14, 1969, p. 160) | 50 and 100 | intraperitoneal | mice | none |
| resistance to fatigue; swimming experiment (Laborit, C.R. Soc. Biol., 1957, No. 7, p. 1383) | 100 | intraperitoneal | young rats | 64% decrease in fatigue |
| Neuro-muscular preparation (Coullant, C.R. Soc. Biol., 1970, 164, No. 4, p. 709) | 1,000 | intraperitoneal | rats | activity = 0.10, P = 0.05; which corresponds to average activity |
| Hypnosis (Boissier, Act. Pharmacologiques, 12th series, p. 1) | 100, 200 and 300 800 | intraperitoneal oral | mice mice | none none |
| Anti-convulsive action (Boissier, Actualites Pharmacologiques, 12th series, page 1) Electric shock | 200 | intraperitoneal | rats | Up to 100% protection against complete crisis, mortal crisis retarded by 63%, P = 0.035, |
| Cardiazole | 100 | intraperitoneal | mice | |
| | 200 | intraperitoneal | mice | 40% protection, |
| Styrchnine | 200 | intraperitoneal | mice | 55% protection |
| Hypothermia-inducing activity | 200 | intraperitoneal | mice | Average hypothermia of 3°C |
| | 50 and 75 | oral | mice | Average hypothermia of 1°C |
| Anti-pyretic activity | 200 | intraperitoneal | rabbits | none |
| Analgesic activity (Woolfe and MacDonald, J. Pharmacol. Exp. Therap., 1944, 80, 300–307) D. 306 alone | 200 | intraperitoneal | mice | Analgesic action + 68%, 20 minutes after the injection + 44%, 40 minutes after the injection 0%, 80 minutes after the injection |
| D. 306 + codeine | 200 + 30 | intraperitoneal | mice | Reinforcement of the activity of codeine: + 27%, 20 minutes after the injection + 42%, 40 minutes after the injection + 54%, 80 minutes after the injection |
| D. 306 + dextromoramide | 100 + 0.3 | intraperitoneal | mice | Reinforcement of the activity of dextromoramide + 40%, 20 minutes after the injection + 65%, 40 minutes after the injection + 70%, 60 minutes after the injection + 52%, 80 minutes after the injection |
| Accustoming (hypothermia) | 6 ingestions of 50 mg/kg over 17 days | oral | mice | No accustoming |
| Isolated mice test (Sofia, Life Sciences, 1969, vol.8, part. 1, p. 705–716) | 200 | intraperitoneal | mice | 42% decrease in aggressiveness |
| | 10 | intraperitoneal | mice | 79% increase in aggressiveness |
| INTERFERENCE WITH CHEMICAL AGENTS | | | | |
| a) Hexobarbital (70 mg/kg) Potentiation of narcosis | 25 | intraperitoneal | mice | + 88%, P <0.001 |
| | 50 | intraperitoneal | mice | +181%, P<0.001 |
| | 100 | intraperitoneal | mice | +314%, P<0.001 |
| | 150 | intraperitoneal | mice | +638%, P<0.001 |
| | 25 | oral | mice | + 50%, P=0.006 |
| | 50 | oral | mice | +160%, P<0.001 |
| | 100 | oral | mice | +228%, P<0.001 |
| | 200 | oral | mice | +268%, P<0.001 |
| Ratio toxic dose / active dose | Hexo (alone) ratio = 4 Hexo (together with D.306) ratio = 6.4 | | | |
| b) Methaqualone 100 mg/kg Potentiation of narcosis | 50 | intraperitoneal | mice | +119%, 0.01>P>0.001 |

TABLE I—Continued

| Experiment | CENTRAL NERVOUS SYSTEM Dose, mg/kg | Administration | Animals | Results |
|---|---|---|---|---|
| c) Reserpine Blepharospasm | 25 × 2<br>100 × 2<br>200 × 2 | intraperitoneal | rats | none<br>ditto<br>ditto |
| d) Amphetamine Group toxicity | 100<br>150<br>200 | intraperitoneal | mice | ditto<br>ditto<br>ditto |
| e) Tremorine 10 mg/kg | 150 | intraperitoneal | mice | Partial inhibition of the effects of tremorine |
|  | 200 | intraperitoneal | mice | Partial inhibition of the effects of tremorine |
| f) Eserine | 50<br>100 and 200 | intraperitoneal<br>intraperitoneal | mice<br>mice | none<br>ditto |
| g) Ascorbic acid | 50 | intraperitoneal | mice | Excitation - Nervousness |

In the case of the ketone D 305, the following results were obtained.

TABLE II

| Experiment | dose mg/kg | Administration | Animal | Result |
|---|---|---|---|---|
| Hexobarbital-induced narcosis | 100 | intraperitoneal | mice | potentiation + 254% |
| Hypnosis | 50<br>100<br>200<br>1,000<br>1,500 | intraperitoneal | mice | none |
| Traction | 200 | intraperitoneal | mice | ditto |
| Turning rod | 200 | intraperitoneal | mice | ditto |
| Reserpine-induced blepharospasm | 100 × 2 | intraperitoneal | rats | ditto |
| Plates with holes | 200 | intraperitoneal | mice | decrease in exploration: 38% |
| Electric shock | 200 | intraperitoneal | rats | 40% protection |

It is apparent from the above tables that the two compounds D 305 and D 306 do not possess any hypnotic or tranquilising action of their own but that they have a very significant potentiating effect on narcosis induced by hexobarbital and by methaqualone and on analgesia induced by codeine and by dextromoramide.

They possess anti-convulsive activity (electric shock, cardiazole) and show marked activity in the swimming experiment (muscular fatigue experiment).

The two compounds thus possess a nervous tropism from depressive tendencies and even dispel anxiety, and they also possess anti-convulsive activity.

They can be used especially as complementary substances in the treatment of anti-social states, as anxietydispelling and anti-depressive agents.

The invention includes within its scope pharmaceutical compositions which comprise one or both of the compounds of the invention in association with a compatible pharmaceutically acceptable carrier. Such compositions may be in a form suitable for oral administration or for endorectal administration. For example tablets, dragees or gelatine-coated pills may contain 100 to 300 mg of the ketone D 305 or of the alcohol D 306.

I claim:

1. 1-(3,4-Methylenedioxy-phenyl)-4,4-dimethylpent-1-en-3-ol.

* * * * *